US010125471B2

United States Patent
Congdon et al.

(10) Patent No.: US 10,125,471 B2
(45) Date of Patent: Nov. 13, 2018

(54) SCARIFIER BOARD FOR MOTOR GRADERS

(71) Applicant: Caterpillar Inc., Peoria, IL (US)

(72) Inventors: Thomas Marshall Congdon, Dunlap, IL (US); David Bruno Parzynski, Jr., Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/380,402

(22) Filed: Dec. 15, 2016

(65) Prior Publication Data

US 2018/0171586 A1   Jun. 21, 2018

(51) Int. Cl.
  *E02F 3/815*  (2006.01)
  *A01B 35/26*  (2006.01)
  *E02F 3/76*   (2006.01)
(52) U.S. Cl.
  CPC .............. *E02F 3/815* (2013.01); *A01B 35/26* (2013.01); *E02F 3/8152* (2013.01); *E02F 3/7604* (2013.01)
(58) Field of Classification Search
  CPC ....... A01B 31/00; A01B 35/26; E02F 3/8152; E02F 3/8157; E02F 9/285; E02F 9/2825; E02F 9/2833; E02F 9/2841; E02F 3/815; E02F 3/7604; E01H 5/061; E01H 5/12; E21C 35/183; E21C 35/1933; E21C 23/082
  USPC ..... 37/266, 244, 452–460; 172/701.1–701.3, 172/719, 747, 777, 691, 699; 299/36.1, 299/111
  See application file for complete search history.

(56) References Cited

U.S. PATENT DOCUMENTS

| | | | |
|---|---|---|---|
| 2,475,710 A | | 7/1949 | Mccauley |
| 2,716,823 A | | 9/1955 | Mullin |
| 2,852,875 A | | 9/1958 | Bierwith et al. |
| 2,914,868 A | | 12/1959 | Launder |
| 2,984,029 A | | 5/1961 | Pederson |
| 3,021,619 A | | 2/1962 | Mcgee |
| 3,934,654 A | * | 1/1976 | Stephenson ............. E01H 5/061 172/701.3 |
| 4,753,299 A | * | 6/1988 | Meyers ................. E02F 9/2825 172/701.3 |
| 4,784,517 A | * | 11/1988 | Bergqvist ............. E01C 23/082 172/701.1 |

(Continued)

FOREIGN PATENT DOCUMENTS

| | | |
|---|---|---|
| AU | 568153 | 12/1987 |
| GB | 2219576 | 12/1989 |

OTHER PUBLICATIONS

"Square Bits Replace Grader Cutting Edge" Machine Design, Penton Media, Cleveand, OH, Us, vol. 62, No. 5, Mar. 8, 1990 (Mar. 8, 1990), p. 86, XP0100123468, ISSN: 0024-9114, Article 2: "Square bits replace grader cutting edge".

*Primary Examiner* — Robert E Pezzuto
(74) *Attorney, Agent, or Firm* — Law Office of Kurt J. Fugman LLC (57) ABSTRACT

A scarifier board comprises a rectangular attachment portion defining a width, a height and a thickness and the attachment portion includes a front face and a back face, and a first plurality of mounting apertures extend through the front face and the back face. The board also includes a working portion defining a plurality of anti-rotation grooves and a plurality of working zones therebetween having a wear resistant material, and the working portion includes a strip of wear resistant material disposed immediately below the attachment portion.

20 Claims, 5 Drawing Sheets

(56) References Cited

U.S. PATENT DOCUMENTS

| | | | | |
|---|---|---|---|---|
| 4,883,129 A | * | 11/1989 | Lonn | E02F 9/285 |
| | | | | 172/701.3 |
| 5,054,217 A | * | 10/1991 | Nilsson | E01H 5/061 |
| | | | | 172/701.1 |
| 6,799,388 B2 | * | 10/2004 | Weaver | E02F 3/8157 |
| | | | | 37/446 |
| 6,854,527 B2 | * | 2/2005 | Manway | E02F 3/8152 |
| | | | | 172/701.1 |
| 6,892,824 B2 | | 5/2005 | Torrey | |
| 7,665,234 B2 | * | 2/2010 | Diehl | E02F 3/8157 |
| | | | | 172/701.3 |
| 9,015,967 B2 | | 4/2015 | May | |
| 9,428,874 B2 | * | 8/2016 | Winter | E01H 5/061 |
| 2016/0032567 A1 | | 2/2016 | Congdon | |

\* cited by examiner

SCARIFIER BOARD FOR MOTOR GRADERS

TECHNICAL FIELD

The present disclosure relates to scarifier boards and ripper carriage assemblies used by motor graders or other similar equipment. More specifically, the present disclosure relates to scarifier boards that allow various mining bits to be attached to the boards, ripper carriage assembly and the motor grader.

BACKGROUND

Machines such as motor graders employ a long blade that is used to level work surfaces during the grading phase of a construction project or the like. These blades often encounter abrasive material such as rocks, dirt, etc. that can degrade the working edge, making such blades ineffective for their intended purpose. In some applications, it is desirable to use mining bits or the like to help break up the working surface such as dirt, soil, rocks, etc. before grading or leveling the surface. Currently, adapter boards have been developed in the field to provide the needed flexibility to be able to use mining bits and other configurations attached to a ripper carriage assembly without needing to change out the entire carriage assembly. However, these designs have drawbacks such as needing several boards to be used to which the mining bits may be attached. Often, an odd number of adapters are needed such that one of these adapters is disposed at a seam between the boards, meaning that the adapter is not properly supported. Also, these boards are susceptible to wear faster than desirable. Moreover, these boards are often heavier and more expensive than desirable.

One prior attachment system that allows a plow blade for a bulldozer to also act as a ripper is disclosed in U.S. Pat. No. 2,475,710 to McCauley. This patent discloses a plow blade that is attached to the bulldozer using a frame or brace members. Ripper blades or bits are attached to the frame behind the blade.

However, the design disclosed in McCauley suffers from several deficiencies in satisfying the needs of the present application. First, McCauley does not teach how to attach mining bits to a motor grader, which typically has a different construction as compared to a bulldozer. Second, this patent requires the welding of a plurality of attachment brackets to the frame of the machine, which is time consuming and expensive. Third, McCauley teaches a complicated system where the spikes are not immediately adjacent the blade, instead having a staggered arrangement of the spikes, and means for changing the depth of the spikes, etc. Accordingly, there exists a need for an adapter system for motor graders to easily and inexpensively attach mining bits or the like to the ripper carriage assembly thereof.

SUMMARY OF THE DISCLOSURE

A scarifier board subassembly for use with the carriage assembly of a grading machine is provided. The subassembly comprises a scarifier board including a rectangular attachment portion defining a width, a height perpendicular to the width, and a thickness perpendicular to the width and height, wherein the width exceeds the height, and the height exceeds the thickness. The attachment portion includes a first plurality of mounting apertures, configured for attaching the board to a first carriage assembly, and a second plurality of mounting apertures configured for attaching the board to a second carriage assembly. The board also includes a working portion extending from the attachment portion along a direction that is oblique to the height of the attachment portion toward a free end, the working portion defining a top surface and a bottom surface extending from the attachment portion to the free end, wherein the top surface defines a plurality of attachment pockets and the bottom surface defines a plurality of anti-rotation grooves.

A scarifier board comprises a rectangular attachment portion defining a width, a height perpendicular to the width, and a thickness perpendicular to the width and height, wherein the width exceeds the height, and the height exceeds the thickness, wherein the attachment portion includes a front face and a back face, and a first plurality of mounting apertures extend through the front face and the back face. The board also includes a working portion extending from the attachment portion along a direction that is oblique to the height of the attachment portion toward a free end, the working portion defining a top surface and a bottom surface that extend from the attachment portion to the free end. The top surface defines a plurality of attachment pockets and the bottom surface defines a plurality of anti-rotation grooves, and the working portion includes a strip of wear resistant material disposed immediately below the attachment portion, being coplanar with the front face of the attachment portion, and the bottom surface is divided into a plurality of working zones by the plurality of anti-rotation grooves, and each zone is covered by the wear resistant material.

A carriage assembly for use with a grading machine is provided. The carriage assembly comprises an upper positioning subassembly and a lower scarifier board subassembly, wherein the upper positioning subassembly is configured to move the lower scarifier board subassembly and includes shank adapter receptacles. The board subassembly includes a scarifier board comprising a rectangular attachment portion defining a width, a height perpendicular to the width, and a thickness perpendicular to the width and height, wherein the width exceeds the height, and the height exceeds the thickness, wherein the attachment portion includes a first plurality of mounting apertures configured for attaching the board to the first carriage assembly, and a second plurality of mounting apertures configured for attaching the board to a second carriage assembly. The board further includes a working portion extending from the attachment portion along a direction that is oblique to the height of the attachment portion toward a free end, the working portion defining a top surface and a bottom surface extending from the attachment portion to the free end. The assembly further includes a plurality of shank adapters attached to the attachment portion via a plurality of fasteners extending through the first plurality of mounting apertures, the shank adapters being retained in the plurality of shank adapter receptacles.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

A scarifier board that may be used with various carriage assemblies of a motor grader or other similar machine will be described herein. In some embodiments, the description will focus on a ripper carriage assembly that uses an optimized scarifier board or ripper subassembly depending on the need. In other embodiments, a scarifier board subassembly that is compatible with ripper carriage assemblies already in the field will be described. In yet further embodiments, a scarifier board that is optimized for prolonged life will be discussed.

First, a machine will now be described to give the reader the proper context for understanding how various embodiments of the present disclosure are used break up a work surface such as soil, dirt, etc. It is to be understood that this description is given as exemplary and not in any limiting sense. Any embodiment of an apparatus or method described herein may be used in conjunction with any suitable machine.

Figure 1:
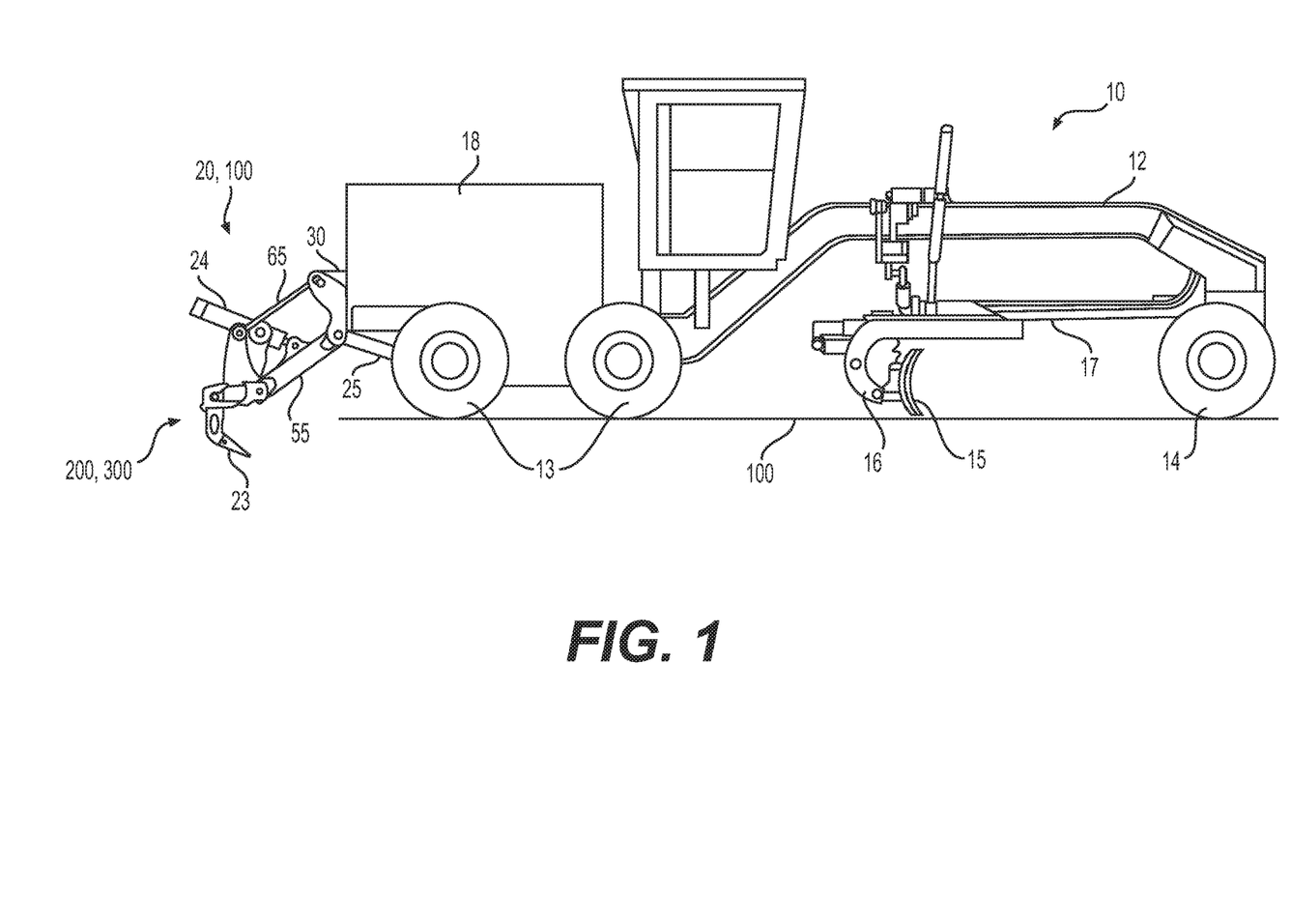
FIG. 1 is a side view of a motor grader that may employ a scarifier board with mining, grading or other types of bits attached thereto according to an embodiment of the present disclosure.

Referring to FIG. 1, a machine 10 such as a motor grader is depicted. The machine 10 has a frame 12 and a ground engaging propulsion system including two sets of rear wheels 13 and a set of front wheels 14. A blade or moldboard 15 is mounted on a blade tilt adjustment mechanism 16 that is supported by a rotatable circle assembly 17 positioned beneath frame 12. A variety of hydraulic cylinders may be provided for controlling the position of the moldboard 15. A prime mover such as engine 18 provides the power necessary to propel the machine 10 as well as operate the various actuators and systems of the machine. In a hydrostatically operated machine, the engine 18 powers a hydro static pump (not shown) which in turn drives a hydrostatic motor (not shown) to propel the machine 10. The hydro static pump may also drive other hydraulic systems of the machine. A ripper assembly 20 may be mounted at a rear section of the frame 12 of the machine 10. Although ripper assembly 20 is mounted on a motor grader, the ripper assembly may be mounted on other types of machines such as a dozer, a tractor and the like.

As alluded to previously, the ripper carriage assembly shown may be substituted with a carriage assembly 100 that may use a scarifier board subassembly 200 with a scarifier board 300 according to various embodiments of the present application as will now be described. The ripper members may be substituted by removing the ripping members and attaching a scarifier board subassembly according to any of the embodiments discussed herein. This provides further versatility to a motor grader for breaking up a work surface such as soil, dirt, rock, etc. before it is leveled or graded.

Figure 2:
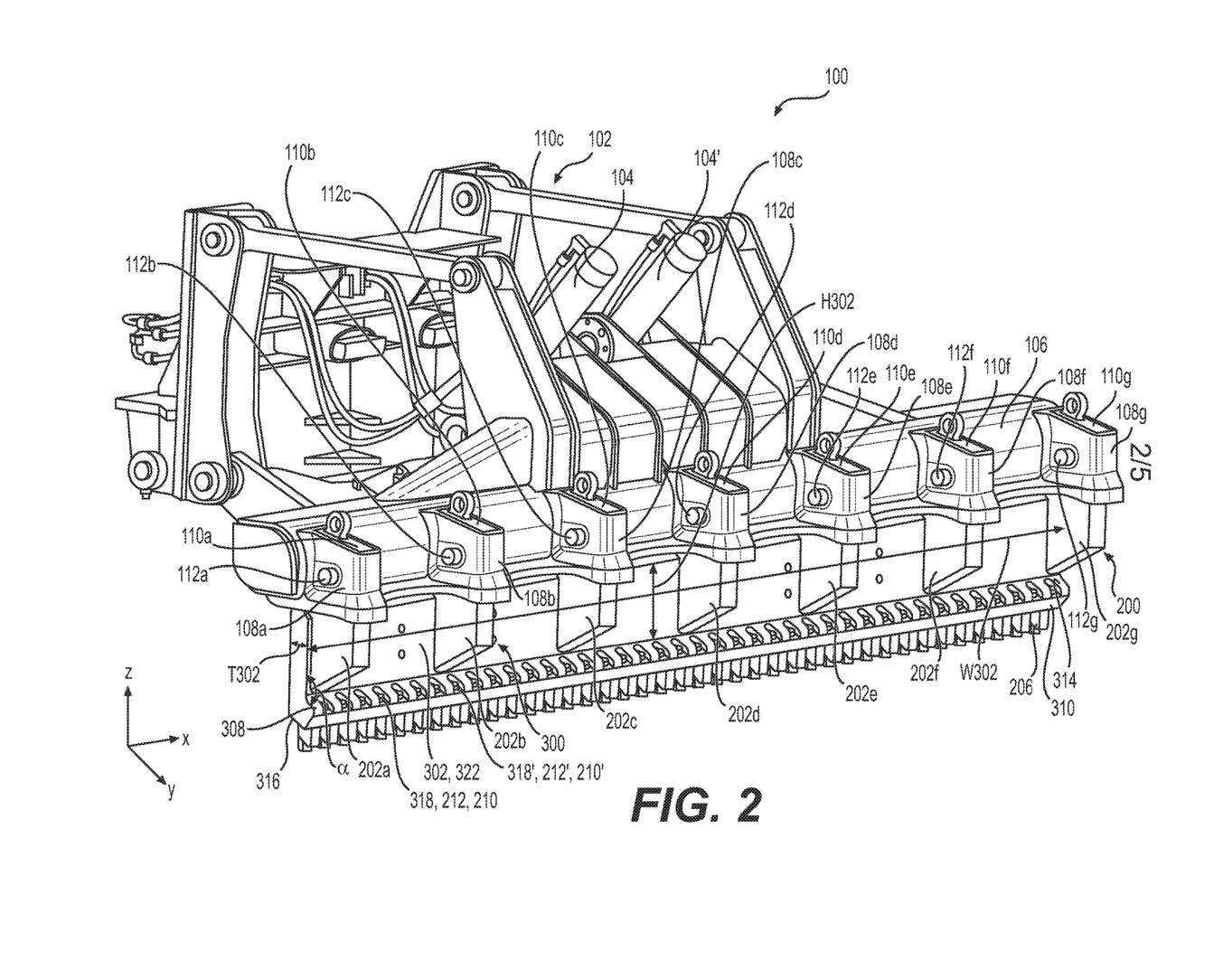
FIG. 2 is a rear perspective view of a carriage assembly with a scarifier board having mining, grading or other types of bits attached thereto according to an embodiment of the present disclosure shown in isolation from a machine.
Figure 3:
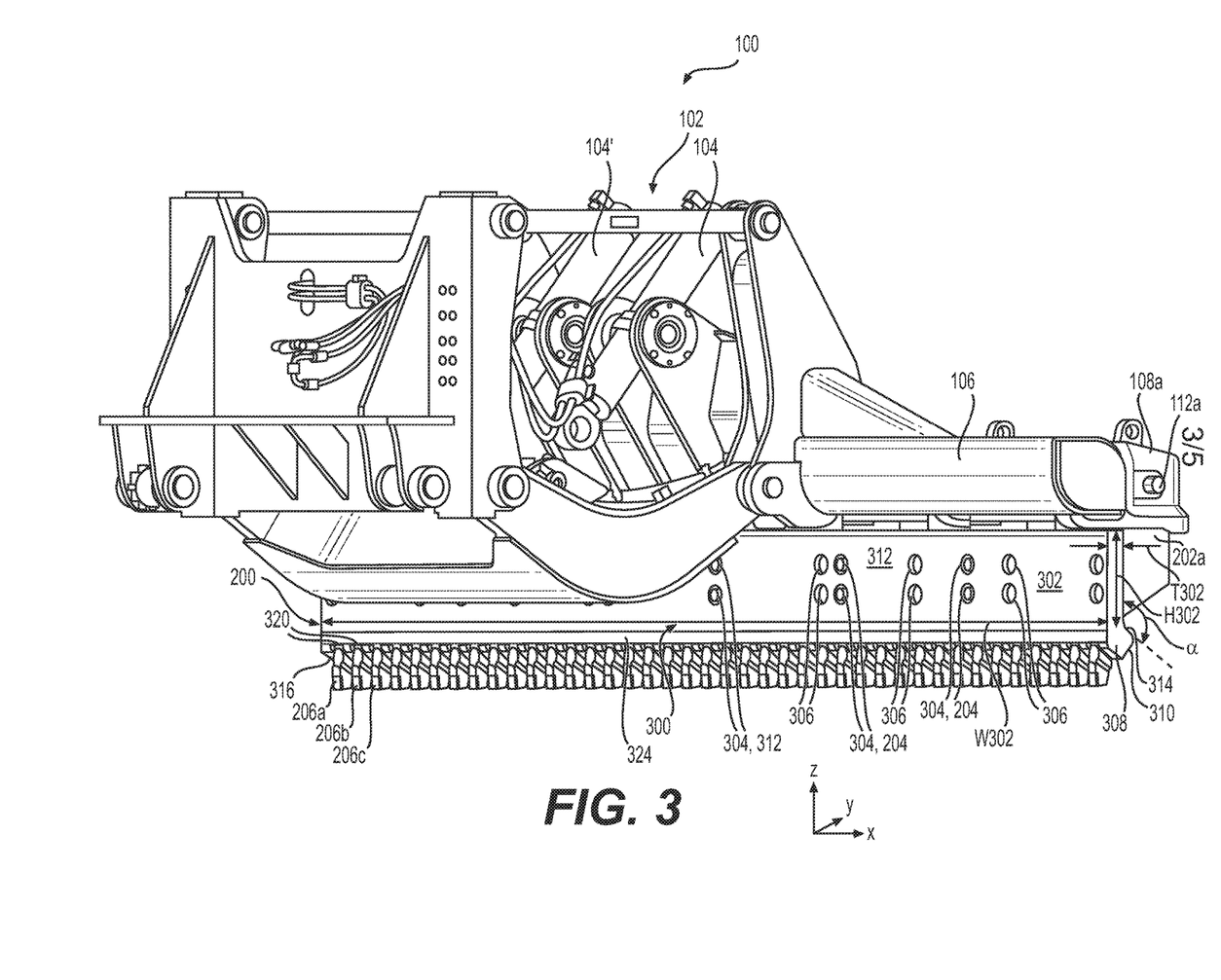
FIG. 3 is a front perspective view of the carriage assembly of FIG. 2 showing the working surfaces of the scarifier board and mining inserts more clearly.

Turning now to FIGS. 2 and 3, a carriage assembly 100 for use with a grading machine such as that shown in FIG. 1 is depicted. The carriage assembly 100 comprises an upper positioning subassembly 102 and a lower scarifier board subassembly 200, wherein the upper positioning subassembly 102 is configured to move the lower scarifier board subassembly 200 using hydraulic cylinders 104, which pivot the lower scarifier board subassembly 200 up and down for engaging and disengaging a work surface in a manner known in the art. The upper positioning subassembly 102 includes and attachment tube 106 that includes a plurality of shank adapter receptacles 108 attached to it. Each shank adapter receptacle 108 has a central opening 110 that extends completely through the receptacle 108 and that is configured to receive a shank adapter 202 therein. Bolts 112 extend through the sides of the receptacles 108, engaging the shank adapters 202 to retain them in a manner known in the art to hold ripping spikes.

In addition to the shank adapters 202, the board subassembly 200 includes a scarifier board 300 comprising a rectangular attachment portion 302 defining a width W302, a height H302 perpendicular to the width W302, and a thickness T302 perpendicular to the width W302 and height H302, wherein the width W302 exceeds the height H302, and the height H302 exceeds the thickness T302. For increased clarity, a Cartesian coordinate system is provided and the height H302 is generally parallel to the Z axis, the width W302 is generally parallel to the X axis, and the thickness T302 is generally parallel to the Y axis. As best seen in FIG. 3, the attachment portion 302 includes a first plurality 304 of mounting apertures configured for attaching the board 300 to the first carriage assembly 100, and a second plurality 306 of mounting apertures configured for attaching the board 300 to a second carriage assembly (not shown). A working portion 308 extends from the attachment portion 302 along a direction that is oblique to the height H302, forming an angle α therewith. This extension of the working portion 308 continues toward a free end 310. As already mentioned, a plurality of shank adapters 202 are attached to the attachment portion 302 via a plurality of fasteners 204 extending through the first plurality 304 of mounting apertures, and the shank adapters 202 are retained in the plurality of shank adapter receptacles 108 via bolts 112 (see FIG. 2).

For this embodiment, the board 300 comprises a single unitary piece. This means that there is no risk of a shank adapter being located near a seam. Furthermore, the structural integrity of the scarifier board assembly may be maximized.

Figure 4:
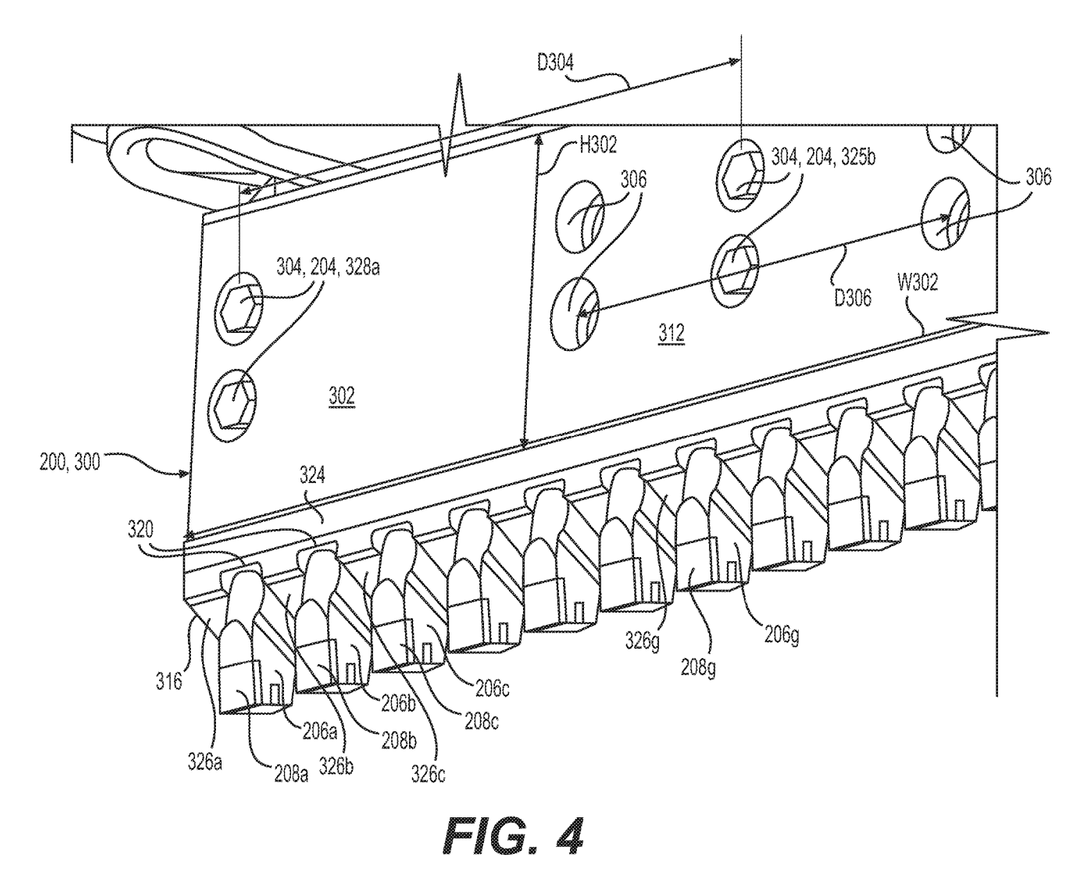
FIG. 4 is an enlarged front perspective view of the carriage assembly of FIG. 3, showing the left portion of the scarifier board and the mining inserts more clearly.

Referring to FIGS. 2 thru 4, the working portion 308 defines a top surface 314 and a bottom surface 316 extending from the attachment portion 302 to the free end 310. The top surface 314 of the working portion 308 defines a plurality of attachment pockets 318 and the bottom surface 316 of the working portion 308 defines a plurality of anti-rotation grooves 320, so called as they support the mining bits 206 and help prevent any unwanted twisting of the mining bits 206 as the bits engage a work surface. Best seen in FIG. 4, these mining bits 206 include inserts 208. Other configurations and types of bits are considered to be within the scope of the present disclosure. It is to be understood that bits 206 are described as mining bits in many applications, but that other types of bits such as grading bits may be used. Also, the configuration of the bits and scarifier board may be altered than what is shown in the drawings as needed or desired. The inserts and bits are shown to be rectangular in shape but other configurations may be employed.

The attachment portion 302 includes a front face 312 and a back face 322, and the mounting apertures 304, 306 extend through the front face 312 and the back face 322, and the working portion 308 includes a strip 324 of wear resistant material disposed immediately below the attachment portion 302, being coplanar with the front face 312 of the attachment portion 302 and extending the full width W302 of the attachment portion 302. Focusing on FIG. 4, the bottom surface 316 of the working portion 316 is divided into a plurality of working zones 326 by the plurality of anti-rotation grooves 320, and each zone is covered by the wear resistant material. The strip 324 and working zones 326 are covered by a wear resistant material since these areas are the most affected by abrasion, other than the bits 206, when the board 300 is used. The wear resistant material may hard facing such as material welded onto the board. The material in such a case may comprise a chromium-manganese alloy. In other embodiments, the wear resistant material may include a ceramic coating or other wear resistant compositions deposited, adhered, or otherwise attached to the board.

As can be understood when looking at FIGS. 2 and 4 together, the attachment portion 302 of the board 300 includes a front face 312 and a back face 322 and the first and second plurality 304, 306 of mounting apertures extend from the front face 312 to the back face 322 and the shank adapters 202 are attached to the back face 322, making contact with the back face, by a plurality of fasteners 204 extending through the first plurality 304 of mounting apertures while the second plurality of mounting apertures are empty 306. The second plurality 306 may be used to attach the board and the board subassembly to a different carriage assembly for a differently sized or configured machine. For the embodiment shown in FIGS. 2 thru 4, it is contemplated the board and subassembly shown may be used with three different machines. Other various configurations are possible.

Put another way, FIGS. 2 thru 4 illustrate a scarifier board subassembly for use with the carriage assembly of a grading machine. The carriage assembly may already be present in the field and be used to attach ripping spikes to the assembly that may be replaced with the board subassembly as will now be described. The subassembly comprising a scarifier board includes an attachment portion configured as already described including a first plurality of mounting apertures, configured for attaching the board to a first carriage assembly, and a second plurality of mounting apertures configured for attaching the board to a second carriage assembly. The working portion extends from the attachment portion along a direction that is oblique to the height of the attachment portion toward a free end. The working portion also defines a top surface and a bottom surface extending from the attachment portion to the free end, wherein the top surface defines a plurality of attachment pockets and the bottom surface defines a plurality of anti-rotation grooves.

The board is formed from an integral piece of material, spanning nine to fifteen feet long. In some applications, the board is about twelve feet long. That is to say, the width of the working and attachment portions 302, 308 is the same and may be twelve feet long. This dimension may be varied as needed or desired. In general, the configuration of the board and any of its dimensions may be varied as needed or desired. Looking at FIG. 4, the first plurality 304 of mounting apertures includes at least seven sets 328 of two mounting apertures, corresponding to each shank adapter 202 aligned in a direction parallel to the height H302 of the attachment portion 302 of the board 300. Thus, fourteen fasteners 204 and seven shank adapters 202 are attached to the board 302 via the fourteen fasteners passing through the seven sets 328 of two mounting apertures. The number and configuration of shank adapters, mounting apertures and fasteners may be altered as needed or desired depending on the application.

The attachment portion 302 includes a front face 312 and a back face 322 and the mounting apertures 304, 306 extend through the front face 312 and the back face 322. The working portion 308 includes a strip 324 of wear resistant material disposed immediately below the attachment portion 302, being coplanar with the front face 312 of the attachment portion 302. The bottom surface 316 of the working portion 308 is divided into a plurality of working zones 326 by the plurality of anti-rotation grooves 320, and each zone 326 is covered by the wear resistant material. In some embodiments, the same wear resistant material is used for both the strip 324 and the working zones 326 or sometimes a different resistant material is used. The wear resistant material may include hard facing. A second plurality of fasteners 212 with heads 214 may be provided, and a plurality of mining bits 206 may be inserted into the anti-rotation grooves 320 and retained therein by the fasteners 212 with the heads 210 disposed in the plurality of attachment pockets 318 (see FIG. 2).

Now, the scarifier board 300 will be described without any reference to the board subassembly 200 or carriage assembly 100. Looking at FIGS. 2 thru 4, the board 300 may comprise an attachment portion 302 including a first plurality 304 of mounting apertures as previously described. A working portion 308 extends from the attachment portion 302 along a direction that is oblique to the height H302 of the attachment portion 302 toward a free end 310, the working portion 308 defining a top surface 314 and a bottom surface 316 that extend from the attachment portion 302 to the free end 310. The top surface 314 defines a plurality of attachment pockets 318 and the bottom surface 316 defines a plurality of anti-rotation grooves 320. The working portion 308 includes a strip 324 of wear resistant material disposed immediately below the attachment portion 302, being coplanar with the front face 312 of the attachment portion 302, and the bottom surface 316 is divided into a plurality of working zones 326 by the plurality of anti-rotation grooves 320, and each zone 326 is covered by the wear resistant material.

In some embodiments, the attachment portion 302 includes a second plurality 306 of mounting apertures differently configured than the first plurality 304 of mounting apertures, allowing the board 300 to be mounted to different board subassemblies 200, carriage assemblies 100 and machines 10 (see FIG. 1). Focusing on FIG. 4, the first plurality 304 of mounting apertures are spaced away from each other the same predetermined distance D304 along the width W302 of the attachment portion 302. In some cases, this predetermined distance D304 may have a slight variance from one instance of this dimension to another such as 1-3 mm. As such, the predetermined distance may be described as being substantially the same from one instance to the next instance. At the same time, the second plurality 306 of mounting apertures are spaced away from each other a different predetermined distance D306 along the width W302 of the attachment portion 302 than the spacing of the first plurality of mounting apertures. In some cases, this predetermined distance D306 may have a slight variance from one instance of this dimension to another such as 1-3 mm. As such, the predetermined distance may be described as being substantially the same from one instance to the next instance. Returning to FIGS. 3 and 4, the board 300 lacks any seams located along the width W302 of the attachment portion 302 that run along a direction parallel to the height of the board. This helps keep the board and board subassembly rigid enough to withstand the stresses when used in the field.

Again, it should be noted that any of the dimensions and configurations of any of the components may be varied as desired or needed and that differently configured bits and inserts may be used in conjunction with the same board if so desired or needed.

INDUSTRIAL APPLICABILITY

In practice, a board, board subassembly, and/or a carriage assembly may be manufactured, bought, assembled, or sold to retrofit an existing machine or carriage assembly in the field to improve provide the user with a more robust and versatile apparatus for breaking up work surfaces. In other situations, the board, board subassembly, and/or carriage assembly may be sold according to any embodiment described herein when a machine is originally bought, etc.

Figure 5:
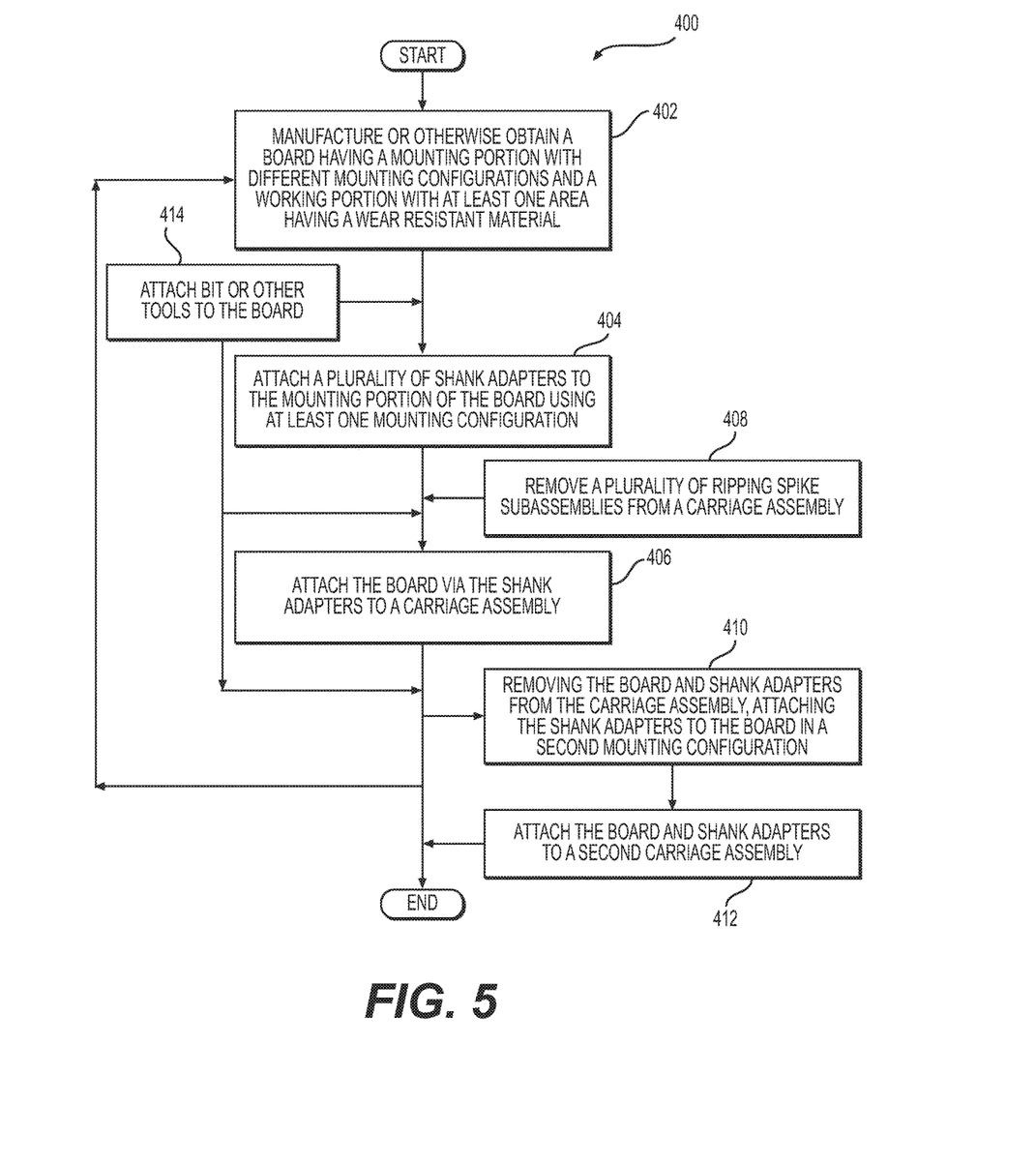
FIG. 5 is a flowchart depicting the steps of manufacturing and assembling a scarifier board with mining, grading or other types of bits to a carriage assembly according to an embodiment of the present disclosure.

In either case, the following method 400 may construct the board, board subassembly and the carriage subassembly. FIG. 5 illustrates the steps of this method. First, a board is manufactured or otherwise obtained having a mounting portion with different mounting configurations and a working portion with at least one area having a wear resistant material (step 402). Second, a plurality of shank adapters are attached to the mounting portion of the board using at least one mounting configuration (step 404). Third, the shank adapters are attached to a carriage assembly using the shank adapters (step 406). Fourth, a plurality of ripping spike subassemblies are removed from the carriage assembly before attaching the board and the shank adapters (step 408). The board and shank adapters are then removed from the carriage assembly and the shank adapters are attached to the board in a second mounting configuration (step 410). Next, the board and shank adapters are attached to a second carriage assembly (step 412). In some embodiments, bits or other tools are attached to the board (step 414). Of course, this process may be performed as many times as needed or desired. Then, the board and/or bits may be used to break up a work surface, etc.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A scarifier board subassembly for use with a carriage assembly of a grading machine, the subassembly comprising a scarifier board including:
   a rectangular attachment portion defining a width, a height perpendicular to the width, and a thickness perpendicular to the width and height, wherein the width exceeds the height, and the height exceeds the thickness, wherein the attachment portion includes a first plurality of mounting apertures, configured for attaching the board to a first carriage assembly, and a second plurality of mounting apertures configured for attaching the board to a second carriage assembly; and
   a working portion extending from the attachment portion along a direction that is oblique to the height of the attachment portion toward a free end, the working portion defining a top surface and a bottom surface extending from the attachment portion to the free end, wherein:
      the top surface defines a plurality of attachment pockets and the bottom surface defines a plurality of anti-rotation grooves and the first plurality of mounting apertures and the second plurality of mounting apertures define two rows of mounting apertures spaced apart along the height of the rectangular attachment portion.

2. The subassembly of claim 1 wherein the board is formed from an integral piece of material, spanning nine to twelve feet long and the first plurality of mounting apertures includes at least seven sets of two mounting apertures aligned in a direction parallel to the height of the attachment portion of the board.

3. The subassembly of claim 2 further comprising fourteen fasteners and seven shank adapters attached to the board via the fourteen fasteners passing through the seven sets of two mounting apertures.

4. The subassembly of claim 1 wherein the attachment portion includes a front face and a back face, the mounting apertures extend through the front face and the back face, and the working portion includes a strip of wear resistant material disposed immediately below the attachment portion, being coplanar with the front face of the attachment portion.

5. The subassembly of claim 4 wherein the bottom surface of the working portion is divided into a plurality of working zones by the plurality of anti-rotation grooves, and each zone is covered by the wear resistant material.

6. The subassembly of claim 1 further comprising a plurality of fasteners with heads and a plurality of mining bits inserted into the anti-rotation grooves and retained therein by the fasteners with the heads disposed in the plurality of attachment pockets.

7. The subassembly of claim 5 wherein the wear resistant material includes hard facing.

8. A scarifier board comprising:
   a rectangular attachment portion defining a width, a height perpendicular to the width, and a thickness perpendicular to the width and height, wherein the width exceeds the height, and the height exceeds the thickness, wherein the attachment portion includes a front face and a back face, and a first plurality of mounting apertures extend through the front face and the back face; and
   a working portion extending from the attachment portion along a direction that is oblique to the height of the attachment portion toward a free end, the working portion defining a top surface and a bottom surface that extend from the attachment portion to the free end, wherein:
   the top surface defines a plurality of attachment pockets and the bottom surface defines a plurality of anti-rotation grooves, and the working portion includes a strip of wear resistant material disposed immediately below the attachment portion, being coplanar with the front face of the attachment portion, and the bottom surface is divided into a plurality of working zones by the plurality of anti-rotation grooves, and each zone is covered by the wear resistant material.

9. The board of claim 8, wherein the wear resistant material of the strip and the zones comprises hard facing.

10. The board of claim 8 wherein the attachment portion includes a second plurality of mounting apertures differently configured than the first plurality of mounting apertures.

11. The board of claim 10 wherein the first plurality of mounting apertures are spaced away from each other the substantially same predetermined distance along the width of the attachment portion.

12. The board of claim 11 wherein the second plurality of mounting apertures are spaced away from each other substantially the same predetermined distance along the width of the attachment portion as the spacing of the first plurality of mounting apertures, and the first plurality of mounting apertures and the second plurality of mounting apertures define two rows of mounting apertures spaced apart along the height of the rectangular attachment portion.

13. The board of claim 8 wherein the board lacks any seams located along the width of the attachment portion that run along a direction parallel to the height of the board.

14. A carriage assembly for use with a grading machine, the carriage assembly comprising:
   an upper positioning subassembly and a lower scarifier board subassembly, wherein the upper positioning subassembly is configured to move the lower scarifier board subassembly and includes shank adapter receptacles, the board subassembly including:
   a scarifier board comprising:
      a rectangular attachment portion defining a width, a height perpendicular to the width, and a thickness perpendicular to the width and height, wherein the width exceeds the height, and the height exceeds the thickness, wherein the attachment portion includes a first plurality of mounting apertures configured for attaching the board to the first carriage assembly, and a second plurality of mounting apertures configured for attaching the board to a second carriage assembly; and
      a working portion extending from the attachment portion along a direction that is oblique to the height of the attachment portion toward a free end, the working portion defining a top surface and a bottom surface extending from the attachment portion to the free end; and
   a plurality of shank adapters attached to the attachment portion via a plurality of fasteners extending through the first plurality of mounting apertures, the shank adapters being retained in the plurality of shank adapter receptacles.

15. The carriage assembly of claim 14 wherein the board comprises a single unitary piece.

16. The carriage assembly of claim 14 wherein the top surface of the working portion defines a plurality of attachment pockets and the bottom surface of the working portion defines a plurality of anti-rotation grooves.

17. The carriage assembly of claim 16 wherein the attachment portion includes a front face and a back face, the mounting apertures extend through the front face and the back face, and the working portion includes a strip of wear resistant material disposed immediately below the attachment portion, being coplanar with the front face of the attachment portion.

18. The carriage assembly of claim 17 wherein the bottom surface is divided into a plurality of working zones by the plurality of anti-rotation grooves, and each zone is covered by the wear resistant material.

19. The carriage assembly of claim 17 wherein the wear resistant material includes hard facing.

20. The carriage assembly of claim 14, wherein the attachment portion of the board includes a front face and a back face and the first and second plurality of mounting apertures extend from the front face to the back face and the shank adapters are attached to the back face by a plurality of fasteners extending through the first plurality of mounting apertures while the second plurality of mounting apertures are empty.

* * * * *